May 26, 1942.  C. L. EKSERGIAN  2,284,484
BRAKE MECHANISM
Filed July 18, 1940  2 Sheets-Sheet 1
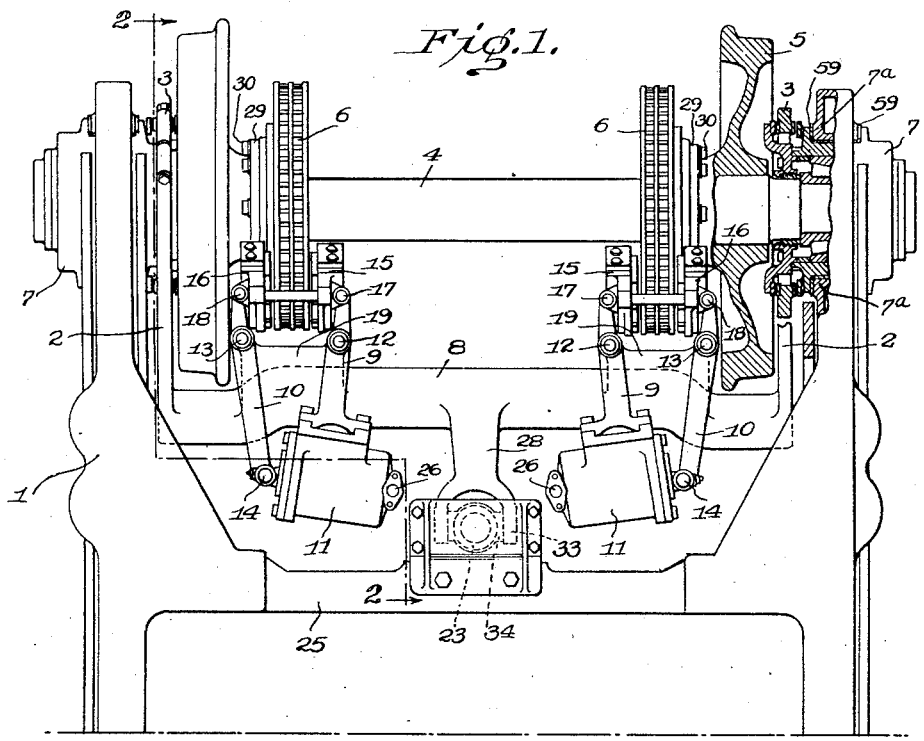
INVENTOR
Carolus L. Eksergian
BY John P. Barty
ATTORNEY May 26, 1942.    C. L. EKSERGIAN    2,284,484
BRAKE MECHANISM
Filed July 18, 1940    2 Sheets-Sheet 2
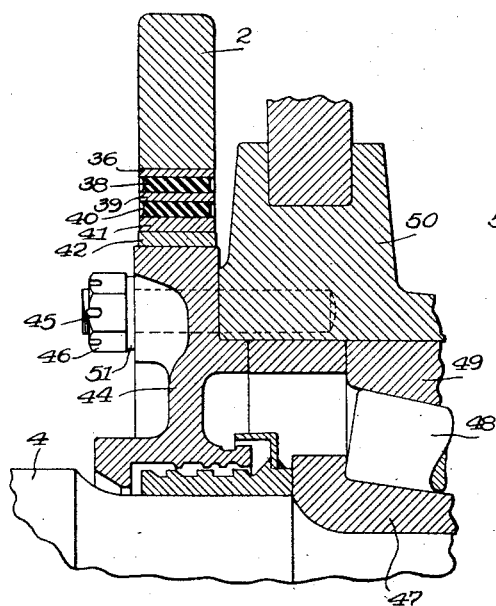
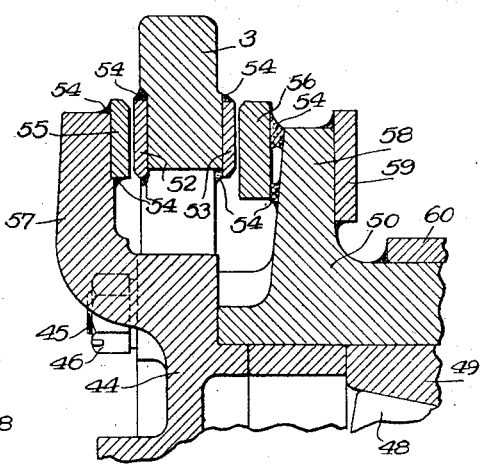
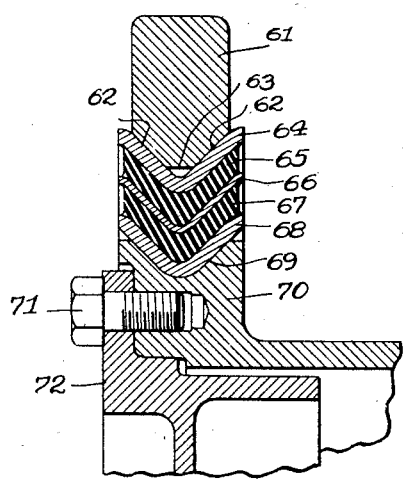
INVENTOR
Carolus L. Eksergian
BY John P. Barby
ATTORNEY Patented May 26, 1942

2,284,484

UNITED STATES PATENT OFFICE 2,284,484

BRAKE MECHANISM

Carolus L. Eksergian, Detroit, Mich., assignor to Budd Wheel Company, Philadelphia, Pa., a corporation of Pennsylvania Application July 18, 1940, Serial No. 346,076

8 Claims. (Cl. 188—59)

The present invention relates to brakes.

More specifically, it relates to brakes of the so-called disk type, particularly that form wherein the brake cylinder and brake shoe are carried by a yoke or C-frame, and may be considered to relate to a modified form of suspension for such C-frame, or other hanger.

A characteristic feature of the present invention is the provision of rubber pads or equivalent devices between the axle and the C-frame, with the object of providing a cushioning action against the impact or shock that otherwise would be transmitted to the C-frame from the wheels. By minimizing such vibration or shock the wear of certain portions of the brake mechanism is materially reduced, because vibration increases the wear of the bearings.

An important object of the resilient yieldable element is to minimize the vertical component of shocks transmitted from the axle to the brake yoke, or hanger.

A further object of the invention is to control the degree of flexibility of such yieldable element and concomitantly therewith the amount of cushioning, in order to maintain sufficiently good alinement between the parts. This object is attained by the proper arrangement of the yieldable element and the proper choice of the amount of yieldable material provided.

Another object of the invention is to reduce lateral shocks also, so that the parts will operate properly within relatively small limits imposed by the small available clearance.

A still further object is to provide a bearing which will not require frequent lubrication or other servicing or attention.

The above and other objects and advantages are attained by the structures disclosed in the present specification and the drawing accompanying the same, illustrative of certain specific forms of the invention.

In said drawings:

Fig. 1 is a diagrammatic plan view partly in section, showing one half of a wheel truck embodying the invention;

Fig. 2 is a fragmentary sectional side elevation on an enlarged scale, the section being made on the planes indicated by the broken line 2—2 of Fig. 1;

Fig. 3 is a fragmentary sectional view on a still further enlarged scale, on the vertical plane indicated by line 3—3 of Fig. 2.

Fig. 4 is a similar section taken on the horizontal plane indicated by the line 4—4 of Fig. 2; and Fig. 5 is a section corresponding to Fig. 3, but showing a modified form of the yieldable device.

In all the figures, similar elements are indicated by the same reference characters.

Referring first to the form illustrated in Figs. 1 to 4, 1 designates the truck frame, having the journal boxes 7 for carrying the axles 4 on which are mounted the wheels 5. These journal boxes 7 are each mounted for the usual vertical sliding movement between spaced truck frame pedestals, as 7a.

Each wheel has a hub flange 29, and a brake ring 6 is secured to such flange in any suitable way, for example by bolts 30.

A brake yoke or C-frame carries mechanisms for cooperating with the brake rings 6. The yoke or C-frame comprises a preferably tubular member 8 extending across the truck frame, and having at each end an arm 2 with a substantially semi-circular end, which cooperates with a connecting strap 3 to form a circular bore or opening as shown in Fig. 2, each strap 3 being secured to the corresponding arm 2 by means of bolts 31 and nuts 32. Extending rearwardly from the tubular crosspiece 8 is an arm 28 having a forked end 33, with a bearing member 34 extending between the arms of the fork and pivotally mounted in said arms.

This bearing member 34 plays vertically within an enclosure formed by a bracket 20, secured to the transom 25 by bolts 27, and a lower cap 21 secured to the bottom of the bracket 20, for example by means of the bolts 22. A helical spring 23 extends between the top of the bearing member 34 and the top of the bracket 20, while another helical spring 24 similarly bears against the bottom of bearing member 34 and against the bottom of the cap 21, so that the bearing member 34 is thereby spring-held within the enclosure formed by said bracket and cap, thus permitting the cross piece 8 of the yoke to pivot vertically through a small angle about the center of the axle 4.

The cross member 8 is provided with means for mounting part of the brake mechanism thereon, in the present example comprising the two flanges 19. To each of these flanges there is pivoted at 12 an inner brake lever 9, and at 13 an outer brake lever 10. Each brake lever 9 carries at its rear or inner end a brake cylinder 11 having an air port 26, and each lever 10 is pivoted at 14 to the piston rod of the corresponding brake cylinder. Brake shoes 15 coact with the inner side surfaces of the brake rings 6 while other brake shoes 16 coact with the outer side surfaces of said rings, these shoes being pivoted to the respective brake levers 9 and 10 at 17 and 18 as shown. It will be understood that suitable flexible air supply means such as hose or the like is connected to the ports 26 of the cylinders, so that when air under pressure is supplied therethrough to the respective cylinders, the brake shoes 15 and 16 will be forced against the corresponding sides of the brake rings 6 to provide the braking force.

The brake yoke is supported concentrically with the journal boxes 7 by means designated as a whole by reference characters 35, and comprising rubber slabs vulcanized to metal plates, which will now be described with particular reference to Figs. 2 and 3. Two arcuate steel plates 36 fitting within the bore formed in the end of a corresponding arm 2 and the strap 3 cooperating therewith, have one end of each bent outward as shown at 37, said ends being engaged between the adjacent ends of 2 and 3. A slab 38 of rubber or similar material is vulcanized to the concave inner surface of each plate 36, and a further metal plate 39 is in turn vulcanized to the concave surface of said rubber slab 38. A second rubber slab 40 is likewise secured between the plate 39 and a further metal plate 41, which fits on the outside of a metal plate 42, and is secured thereto in any preferred manner. The plate 42 is in turn secured to a relatively stationary part of the wheel truck, for example the flange 44, by any suitable means, such as the welds shown at 43.

The axle 4 may be mounted for rotation in the journal box 7 in any preferred way, for instance an inner bearing race 47 may be mounted upon the axle and a cooperating outer race 49 may be arranged concentrically around the inner race 47, with suitable anti-friction devices, such as the rollers 48, arranged between the two bearing races.

The stationary parts 44 and 50 forming parts of the journal box 7 may be secured to one another in any suitable way, for example by means of stud bolts 45 threaded into 50 in cooperation with nuts 46 and lock washers 51. It will be seen from Fig. 2 that the rubber slabs lie predominantly in a horizontal direction above and below the stationary element 44, and the objects and advantages of this arrangement will be explained hereinafter.

Referring to Figs. 2 and 4, means are shown for limiting the side play of the arms 2 of the brake yoke and the straps 3 connected thereto. Each strap 3 and arm 2 is here shown to have wear plates 52 and 53 secured to opposite lateral surfaces thereof, preferably by welds as indicated at 54. These wear plates 52 and 53 are made of highly resistant material, such as a manganese alloy or other extremely wear-resistant steel. Companion wear plates 55 and 56 are suitably spaced from the wear plates 52 and 53 and welded respectively to an arm 57 on the member 44 and the flange 58 of the member 50 as clearly shown in Fig. 4. The wear plates are normally out of contact with one another but serve to come in contact when necessary to prevent excessive yield of the rubber slabs 38 and 40 in a lateral direction. Other wear plates 59 and 60 may also be secured to the member 50 of journal box 7, to coact with the pedestals formed in the side frames of the truck 1.

Referring now to the modified construction disclosed in Fig. 5, 61 represents a portion of the yoke or C-frame, corresponding to the arm portion 2 of Fig. 3. It will be noted that the inner boundary of 61 is here formed of two conical surfaces 62, joined by a relatively narrow cylindrical surface 63, that is, forming what may be designated as a V-shaped cross section.

In order to cooperate with this section, the outer steel ring 64, forming part of the rubber sandwich, is similarly shaped to fit against said member 61 so that the said member 64 might be described as similar to a sector of a V-grooved pulley rim. A correspondingly shaped rubber element 65 is vulcanized within the plate 64 and the rubber slab 65 likewise has a similarly shaped plate 66 vulcanized to its other surface.

The rubber sandwich is completed by a further slab of rubber 67 vulcanized to the remaining surface of the plate 66 and to the outer surface of the inner steel plate 68. The plate 68 is received in a correspondingly shaped groove 69 in the flange 70 of the journal box, which is secured in any desired way to the interfitting member 72, for example by means of cap screws 71.

While the form of the invention disclosed in Fig. 5 may be used in conjunction with the lateral wear plates of Fig. 4, this will not always be necessary, inasmuch as the special shape given to the rubber sandwich in Fig. 5 is such that it possesses a high degree of resistance to lateral shifting, thus eliminating entirely or to a great extent any need for such laterally placed wear plates.

The operation of the form disclosed in Figs. 1 to 4 is as follows: The brake mechanism operates in the usual way, that is, when compressed air is applied to the brake cylinders 11 through the ports 26, each cylinder will move inwardly while its piston moves outwardly, thus causing the levers 9 and 10 to apply the brake shoes 15 and 16 against the faces of the brake ring 5.

The rubber slabs yieldably hold the arms 2 of the C-frame or brake yoke in proper position while permitting a sufficient angle of rotation about the axle 4. It will be understood that such rotation or oscillation of the C-frame stresses the rubber in shear.

Vertical vibration of the axle 4 with respect to the truck frame 1 will be absorbed to a large extent by the rubber, namely, instead of transmitting such vibration to the C-frame, the rubber will thereby be stressed in tension and compression. It will be seen that the rubber extends primarily in a horizontal direction, so as to support the vertical stresses.

Fig. 2 clearly shows that there is no corresponding "vertical" rubber, and this has several advantages. In the first place, such vertically arranged rubber would be stressed solely in shear by vertical stresses, and thus would yield too readily to vertical shocks and vibrations while at the same time it would needlessly increase the torsional resistance to rotation of the C-frame. It should be borne in mind that rubber exhibits a much greater rate in compression than in shear, that is, the resistance to compressive stresses increases much more rapidly with the deflection under load than does the resistance to shearing stresses.

The interposition of the steel spacers between the rubber slabs secures proper distribution of the stresses while at the same time it limits the lateral yield, thus assisting in keeping the C-frame properly alined within the rather narrow allowable limits.

In the form shown in Fig. 5 the lateral yield obviously is still further limited by the V-shaped cross section of the rubber elements, inasmuch as in this form one side or the other of the V will be compressed when lateral sway occurs, whereas in the form shown in Figs. 1 to 4 the rubber is stressed in shear under the same conditions. Thus in the Fig. 5 form it may be that the wear plates become unnecessary in certain installations.

It should be understood that while usually a C-frame is the preferred type of hanger for the brake shoe applying means, it is by no means the sole form available, and in certain cases the hanger may have either only a single arm mounted coaxially with the brake ring or even more than two arms, in place of the bifurcated yoke specifically disclosed. The term "hanger" is therefore to be construed as broad enough to include such brake mechanism supports, regardless of the number of arms incorporated therein.

Having disclosed the principles of the invention and several structural embodiments at present believed to be preferred forms, it should be understood that various other alterations, additions and omissions also may be made therein without departing from the spirit of the invention, which is defined solely in the following claims.

I claim:

1. In a wheel truck having a journal box, an axle carried thereby, brake mechanism comprising a brake ring rotating with the axle, and a brake shoe cooperating therewith, means for actuating said brake shoe, a yoke supporting said means, means comprising two curved rubber sandwiches located one above and one below the journal box for supporting said yoke on said journal box for oscillation about an axis substantially in alinement with the axis of the brake ring, said sandwiches being of limited circumferential extent so as to leave the sides of the journal box for the most part free thereof, and yieldable means supporting said yoke at a point remote from said axis.

2. In a wheel truck having a journal box, an axle carried thereby, brake mechanism comprising a brake ring rotating with the axle, and a brake shoe cooperating therewith, means for actuating said brake shoe, a yoke supporting said actuating means, means comprising two arcuate rubber sandwiches located one above and one below the journal box for supporting said yoke on said journal box for oscillation about an axis substantially in alinement with the axis of the brake ring, each sandwich having its rubber V-shaped in cross-section, and yieldable means supporting said yoke at a point remote from said axis.

3. In a wheel truck having a journal box, an axle carried thereby, brake mechanism comprising a brake ring rotating with the axle, and a brake shoe cooperating therewith, means for actuating said brake shoe, a yoke supporting said actuating means, means comprising two arcuate rubber sandwiches located one above and one below the journal box for supporting said yoke on said journal box for oscillation about an axis substantially in alinement with the axis of the brake ring, said sandwiches being of limited circumferential extent so as to leave the sides of the journal box for the most part free thereof, and means laterally spaced from the yokes adjacent said journal box for preventing undue lateral shift of the yoke.

4. In a wheel truck having a journal box, an axle carried thereby, brake mechanism comprising a brake ring rotating with the axle, and a brake shoe cooperating therewith, means for actuating said brake shoe, a yoke supporting said actuating means, means comprising two arcuate rubber sandwiches located one above and one below the journal box for supporting said yoke on said journal box for oscillation about an axis substantially in alinement with the axis of the brake ring, said sandwiches being of limited circumferential extent so as to leave the sides of the journal box for the most part free thereof, and means laterally spaced from the yoke adjacent said journal box for preventing undue lateral shift of the yoke, said last-named means comprising wear plates.

5. A brake mechanism comprising a rotatable brake member, a non-rotatable brake member cooperating therewith, means for actuating said brake members into braking engagement, a hanger for supporting said non-rotatable brake member and said actuating means, means comprising yieldable material supporting said hanger for oscillation about an axis substantially in alinement with the axis of the rotatable brake member and other means for supporting said hanger at a point remote from said axis, said yielding material comprising rubber slabs having arcuate inner surfaces arranged above and below the axis and between said hanger and the axis, the slabs being of limited circumferential extent, leaving the side portions of the hanger and axis for the most part free thereof.

6. A brake mechanism comprising a rotatable brake member, a non-rotatable brake member cooperating therewith, a hanger for supporting said non-rotatable brake member, means comprising yielding material for supporting said hanger for oscillation about an axis substantially in alinement with the axis of the rotatable brake member and other means for supporting said hanger, to permit such oscillation, at a point remote from said axis, said yielding means comprising upper and lower units each consisting of a plurality of arcuate rubber slabs with metal spacers therebetween and each disposed between the hanger and said axis, the slabs being of limited circumferential extent, leaving the side portions of the hanger and axis for the most part free thereof.

7. In a wheel truck having a journal box, an axle carried thereby, brake mechanism comprising a brake member rotating with the axle, and a non-rotatable brake member cooperating therewith, means for actuating said members into cooperative braking engagement, a hanger supporting said non-rotatable brake member and having a supporting bearing encircling the journal box and a second support means remote from the axle, yielding means between said supporting bearing and journal box, comprising upper and lower arcuate rubber slabs disposed between said bearing and journal box and secured thereto, the slabs being of limited circumferential extent so as to leave the side portions of the bearing and journal box for the most part free thereof.

8. In a wheel truck having a journal box, an axle carried thereby, brake mechanism comprising a brake ring rotating with the axle, and a brake shoe cooperating therewith, means for actuating said brake shoe, a yoke supporting said actuating means, means comprising two arcuate rubber sandwiches located one above and one below the journal box for supporting the yoke on said journal box for oscillation about an axis substantially in alignment with the axis of the brake ring, each sandwich having its rubber reentrant on one side and bulging on the other side in cross-section, and yieldable means supporting said yoke at a point remote from said axis.

CAROLUS L. EKSERGIAN.